(12) United States Patent
VanTassel et al.

(10) Patent No.: US 10,001,013 B2
(45) Date of Patent: Jun. 19, 2018

(54) TURBINE ROTOR BLADES WITH PLATFORM COOLING ARRANGEMENTS

(71) Applicant: General Electric Company, Schenectady, NY (US)

(72) Inventors: Brad Wilson VanTassel, Easley, SC (US); James Ryan Connor, Greenville, SC (US); Bryan David Lewis, Mauldin, SC (US); Adebukola Oluwaseun Benson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 582 days.

(21) Appl. No.: 14/198,659

(22) Filed: Mar. 6, 2014

(65) Prior Publication Data

US 2015/0252673 A1 Sep. 10, 2015

(51) Int. Cl.
| | | |
|---|---|---|
| *F01D 5/18* | (2006.01) | |
| *F01D 5/08* | (2006.01) | |
| *F01D 11/24* | (2006.01) | |
| *B23P 15/02* | (2006.01) | |

(52) U.S. Cl.
CPC .............. *F01D 5/082* (2013.01); *B23P 15/02* (2013.01); *F01D 5/187* (2013.01); *F01D 11/24* (2013.01); *F05D 2240/11* (2013.01); *F05D 2240/81* (2013.01); *F05D 2260/201* (2013.01); *Y02T 50/676* (2013.01); *Y10T 29/49341* (2015.01)

(58) Field of Classification Search
CPC ..... F01D 5/187; F05D 2240/81; Y02T 50/676

USPC .......................................................... 415/115
See application file for complete search history.

(56) References Cited

U.S. PATENT DOCUMENTS

| | | | |
|---|---|---|---|
| 5,639,216 A | 6/1997 | McLaurin et al. | |
| 6,120,249 A | 9/2000 | Hultgren et al. | |
| 6,190,130 B1 * | 2/2001 | Fukue | F01D 5/187 415/115 |
| 6,196,799 B1 * | 3/2001 | Fukue | F01D 5/186 416/97 R |
| 6,641,360 B2 | 11/2003 | Beeck et al. | |
| 7,186,089 B2 | 3/2007 | Liang | |

(Continued)

FOREIGN PATENT DOCUMENTS

| | | |
|---|---|---|
| EP | 0937863 A2 | 8/1999 |
| EP | 0940561 A1 | 9/1999 |

(Continued)

OTHER PUBLICATIONS

European Search Report and Written Opinion issued in connection with corresponding EP Application No. 15157339.1-1610 dated Jul. 13, 2015.

(Continued)

*Primary Examiner* — Matthew W Jellett
(74) *Attorney, Agent, or Firm* — Ernest G. Cusick; Frank A. Landgraff

(57) ABSTRACT

Platform cooling arrangements in a turbine rotor blade include a feedhole that extends from the suction side slash face to the interior cooling passage, and, one or more branch holes that each extends from the feedhole to the suction side slash face such that coolant flows from the interior cooling passage, through the feedhole to the one or more branch holes and exits the platform along the suction side slash face.

20 Claims, 9 Drawing Sheets

(56) References Cited

U.S. PATENT DOCUMENTS

| | | |
|---|---|---|
| 7,416,391 B2 | 8/2008 | Veltre et al. |
| 7,758,309 B2 * | 7/2010 | Bolms .................. F01D 5/081 |
| | | 416/193 A |
| 7,988,418 B2 * | 8/2011 | Cunha .................. B22C 9/04 |
| | | 416/193 A |
| 8,096,772 B2 * | 1/2012 | Liang .................. F01D 11/001 |
| | | 415/115 |
| 8,231,348 B2 | 7/2012 | Torii et al. |
| 8,511,995 B1 | 8/2013 | Liang |
| 8,517,680 B1 | 8/2013 | Liang |
| 9,249,674 B2 * | 2/2016 | Ellis .................. F01D 5/187 |
| 2005/0095125 A1 | 5/2005 | Chang et al. |
| 2007/0201979 A1 * | 8/2007 | Veltre .................. F01D 5/187 |
| | | 416/97 R |
| 2009/0202339 A1 | 8/2009 | Torii et al. |
| 2009/0263235 A1 | 10/2009 | Tibbott et al. |
| 2010/0329888 A1 | 12/2010 | Nadvit et al. |
| 2012/0063916 A1 | 3/2012 | Boyer |
| 2012/0082564 A1 | 4/2012 | Ellis et al. |
| 2012/0082566 A1 * | 4/2012 | Ellis .................. F01D 5/087 |
| | | 416/97 R |
| 2012/0107135 A1 | 5/2012 | Harris, Jr. et al. |
| 2013/0171003 A1 | 7/2013 | Ellis et al. |
| 2013/0171004 A1 | 7/2013 | Ellis et al. |
| 2013/0171005 A1 | 7/2013 | Ellis et al. |

FOREIGN PATENT DOCUMENTS

| | | |
|---|---|---|
| EP | 0866214 B1 | 6/2003 |
| EP | 1013880 B1 | 3/2004 |
| EP | 1795703 B1 | 3/2010 |
| EP | 2228518 A2 | 9/2010 |
| EP | 1561900 B1 | 3/2011 |
| EP | 1514999 B1 | 1/2012 |
| EP | 2365187 A3 | 5/2013 |
| EP | 2597260 A1 | 5/2013 |
| JP | 2005009496 A | 1/2005 |

OTHER PUBLICATIONS

Unofficial English translation of Office Action issued in connection with corresponding CN Application No. 201510100246.0 dated May 2, 2017.

\* cited by examiner

TURBINE ROTOR BLADES WITH PLATFORM COOLING ARRANGEMENTS

BACKGROUND OF THE INVENTION

The present application relates generally to combustion turbine engines, which, as used herein and unless specifically stated otherwise, includes all types of combustion turbine engines, such as those used in power generation and aircraft engines. More specifically, but not by way of limitation, the present application relates to apparatus, systems and/or methods for cooling the platform region of turbine rotor blades.

A gas turbine engine typically includes a compressor, a combustor, and a turbine. The compressor and turbine generally include rows of airfoils or blades that are axially stacked in stages. Each stage typically includes a row of circumferentially spaced stator blades, which are fixed, and a set of circumferentially spaced rotor blades, which rotate about a central axis or shaft. In operation, the rotor blades in the compressor are rotated about the shaft to compress a flow of air. The compressed air is then used within the combustor to combust a supply of fuel. The resulting flow of hot gases from the combustion process is expanded through the turbine, which causes the rotor blades to rotate the shaft to which they are attached. In this manner, energy contained in the fuel is converted into the mechanical energy of the rotating shaft, which then, for example, may be used to rotate the coils of a generator to generate electricity.

Referring to FIGS. 1 and 2, turbine rotor blades 100 generally include an airfoil portion or airfoil 102 and a root portion or root 104. The airfoil 102 may be described as having a convex suction face 105 and a concave pressure face 106. The airfoil 102 further may be described as having a leading edge 107, which is the forward edge, and a trailing edge 108, which is the aft edge. The root 104 may be described as having structure (which, as shown, typically includes a dovetail 109) for affixing the blade 100 to the rotor shaft, a platform 110 from which the airfoil 102 extends, and a shank 112, which includes the structure between the dovetail 109 and the platform 110.

The platform 110 may comprise a variety of configurations such as planar (as illustrated in FIG. 4), contoured or any other suitable variations. (Note that "planar," as used herein, means approximately or substantially in the shape of a plane. For example, one of ordinary skill in the art will appreciate that platforms may be configured to have an outboard surface that is slight curved and convex, with the curvature corresponding to the circumference of the turbine at the radial location of the rotor blades. As used herein, this type of platform shape is deemed planar, as the radius of curvature is sufficiently great to give the platform a flat appearance.) For example, with specific reference to FIG. 4, the platform 110 may have a topside 113, which, as shown in FIG. 1, may include an axially and circumferentially extending flat surface. As shown in FIG. 2, the platform 110 may have a underside 114, which may also include an axially and circumferentially extending flat surface. The topside 113 and the bottom side 114 of the platform 110 may be formed such that each is substantially parallel to the other. As depicted, it will be appreciated that the platform 110 typically has a thin radial profile, i.e., there is a relatively short radial distance between the topside 113 and the bottom side 114 of the platform 110.

In general, the platform 110 may be employed on turbine rotor blades 100 to form the inner flow path boundary of the hot gas path section of the gas turbine. The platform 110 further provides structural support for the airfoil 102. In operation, the rotational velocity of the turbine induces mechanical loading that can create relatively stressed regions along the platform 110 that may further experience elevated temperatures.

One method to make the platform region 110 more durable is to cool it with a flow of compressed air or other coolant during operation. However, as one of ordinary skill in the art will appreciate, the platform region 110 presents certain design challenges. In significant part, this is due to the geometry of this region, in that, as described, the platform 110 is a periphery component that resides away from the central core of the rotor blade and typically is designed to have a structurally sound, but thin radial thickness.

To circulate coolant, rotor blades 100 typically include one or more interior cooling passages 116 (see FIGS. 3 and 4) that, at minimum, extend radially through the core of the blade 100, including through the root 104 and the airfoil 102. As described in more detail below, to increase the exchange of heat, such interior cooling passages 116 may be formed having a serpentine path that winds through the central regions of the blade 100, though other configurations are possible. In operation, a coolant 180 may enter the interior cooling passages 116 via one or more inlets 117 formed in the inboard portion of the root 104. The coolant 180 may circulate through the blade 100 and exit through outlets (not shown) formed on the airfoil and/or via one or more outlets (not shown) formed in the root 104. The coolant 180 may be pressurized, and, for example, may include pressurized air, pressurized air mixed with water, steam, and the like. In many cases, the coolant 180 is compressed air that is diverted from the compressor of the engine, though other sources are possible.

In some cases, the interior cooling passages 116 may further comprise a cavity 119 formed between the shanks 112 and platforms 110 of adjacent rotor blades 100. From there, the coolant 180 may be used to cool the platform region 110 of the blade by connecting cooling passages in the platform to one or more parts of interior cooling passages 116 (e.g. the cavity 119) of the turbine rotor blade. For example, coolant may be extracted from one of the interior cooling passages 116 (such as into the cavity 119 formed between the shanks 112/platforms 110) and supplied to cooling channels that extend through the platforms 110. After traversing the platform 110, the cooling air may exit the cavity through film cooling holes formed in the topside 113 of the platform 110.

It will be appreciated, however, that this type the cooling circuit is not self-contained in one part, as the cooling circuit depending on the cavity 119 is only formed after two neighboring rotor blades 100 are assembled. This may produce greater complexity to installation and testing. An alternative design for platform cooling can comprise a cooling circuit contained within the rotor blade 100 and does not involve the shank cavity 119, as depicted in FIG. 3. Cooling air is extracted from one of the interior cooling passages 116 that extend through the core of the blade 110 and directed aft through cooling channels formed within the platform 110. The coolant 180 flows through the platform cooling channels to help cool the component. However, placing cooling channels in the platform 110 is often achieved in the relatively hottest areas such as on the concave pressure face 106 side of the airfoil 102. Moreover, cooling channel arrangements may be complex (e.g., curved or serpentine) for distribution of coolant 180 thereby requiring casting or other initial manufacturing considerations that prevent or limit making such modifications in pretexting parts.

Accordingly, alternative platform cooling arrangements would be welcome in the art.

BRIEF DESCRIPTION OF THE INVENTION

In one embodiment, a platform cooling arrangement in a turbine rotor blade is disclosed. The turbine rotor blade includes a platform at an interface between an airfoil and a root, wherein the turbine rotor blade includes an interior cooling passage formed therein that extends from a connection with a coolant source at the root to the approximate radial height of the platform, and wherein a suction side of the platform comprises a topside extending circumferentially from the airfoil to a suction side slash face. The platform cooling arrangement includes a feedhole that extends from the suction side slash face to the interior cooling passage, and, one or more branch holes that each extends from the feedhole to the suction side slash face. In operation, coolant from the coolant source flows from the interior cooling passage, through the feedhole to the one or more branch holes and exits the platform along the suction side slash face.

In one embodiment, a platform cooling arrangement in a turbine rotor blade is disclosed. The turbine rotor blade includes a platform at an interface between an airfoil and a root, wherein the turbine rotor blade includes an interior cooling passage formed therein that extends from a connection with a coolant source at the root to the approximate radial height of the platform, and wherein a suction side of the platform comprises a topside extending circumferentially from the airfoil to a suction side slash face. The platform cooling arrangement includes a feedhole that extends from a forward edge of the platform to the interior cooling passage, and, one or more branch holes that each extends from the feedhole to the suction side slash face. In operation, coolant from the coolant source flows from the interior cooling passage, through the feedhole to the one or more branch holes and exits the platform along the suction side slash face.

In another embodiment, a method is disclosed for forming a platform cooling arrangement in a turbine rotor blade. The method includes providing a turbine rotor blade having a platform at an interface between an airfoil and a root, wherein the turbine rotor blade includes an interior cooling passage formed therein that extends from a connection with a coolant source at the root to the approximate radial height of the platform, and wherein a suction side of the platform comprises a topside extending circumferentially from the airfoil to a suction side slash face. The method further includes forming a feedhole that extends from the suction side slash face to the interior cooling passage, and, forming one or more branch holes that each extends from the feedhole to the suction side slash face. In operation, coolant from the coolant source flows from the interior cooling passage, through the feedhole to the one or more branch holes and exits the platform along the suction side slash face.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
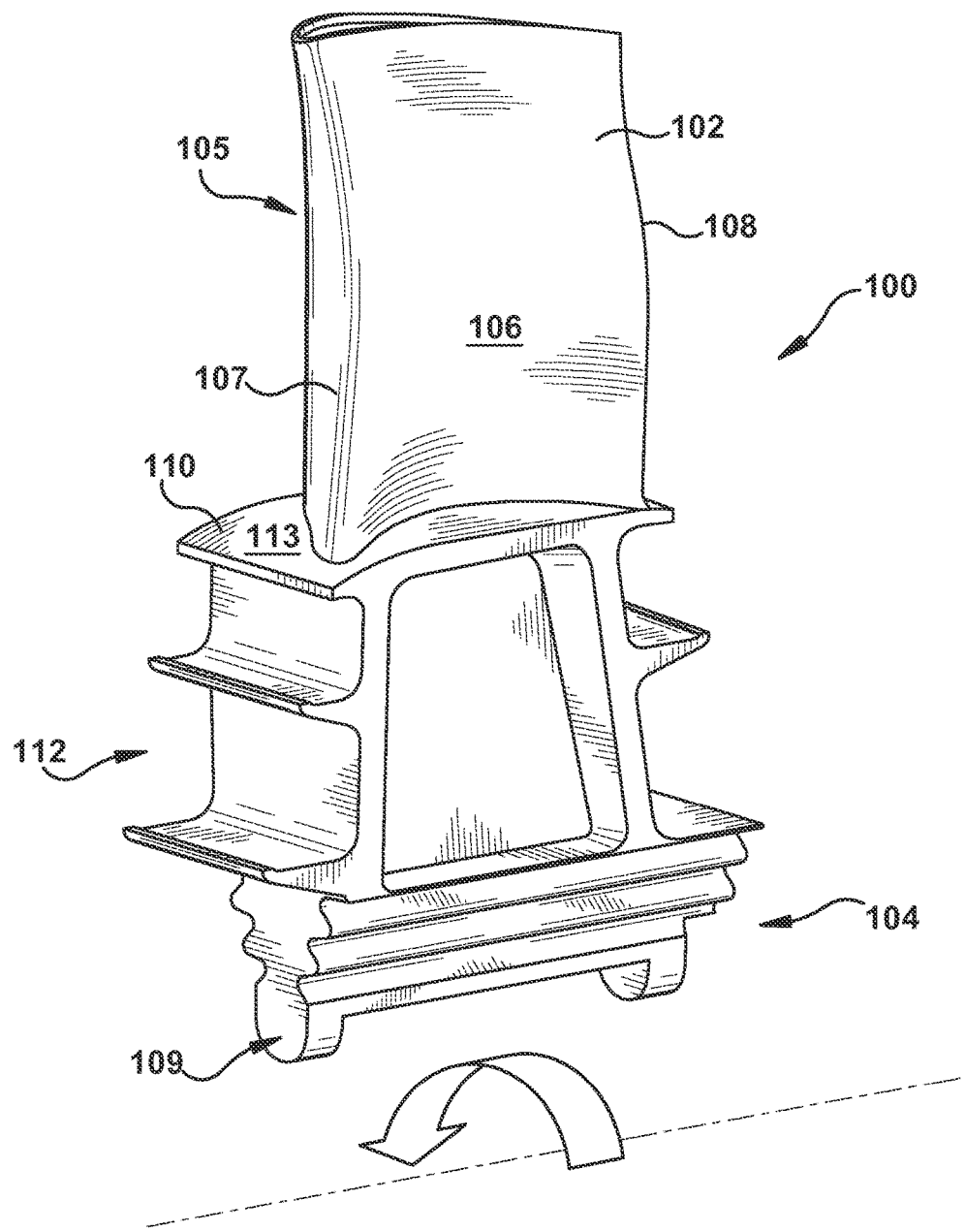
FIG. 1 illustrates a perspective view of an exemplary turbine rotor blade in which one or more embodiments of the present disclosure may be used.
Figure 2:
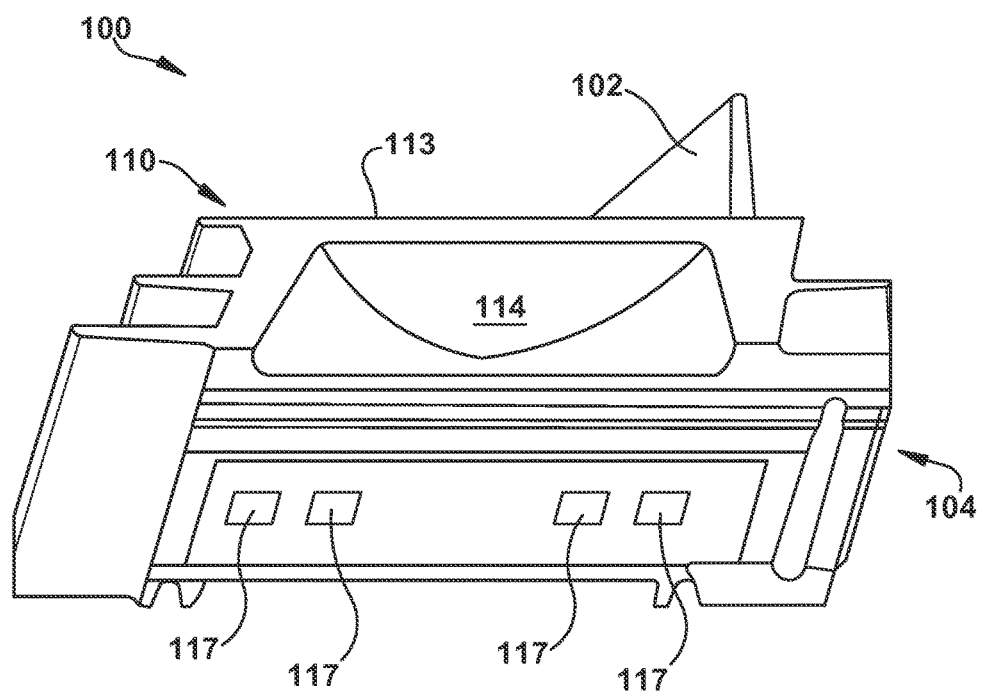
FIG. 2 illustrates an underside view of a turbine rotor blade in which one or more embodiments of the present disclosure may be used.
Figure 3:
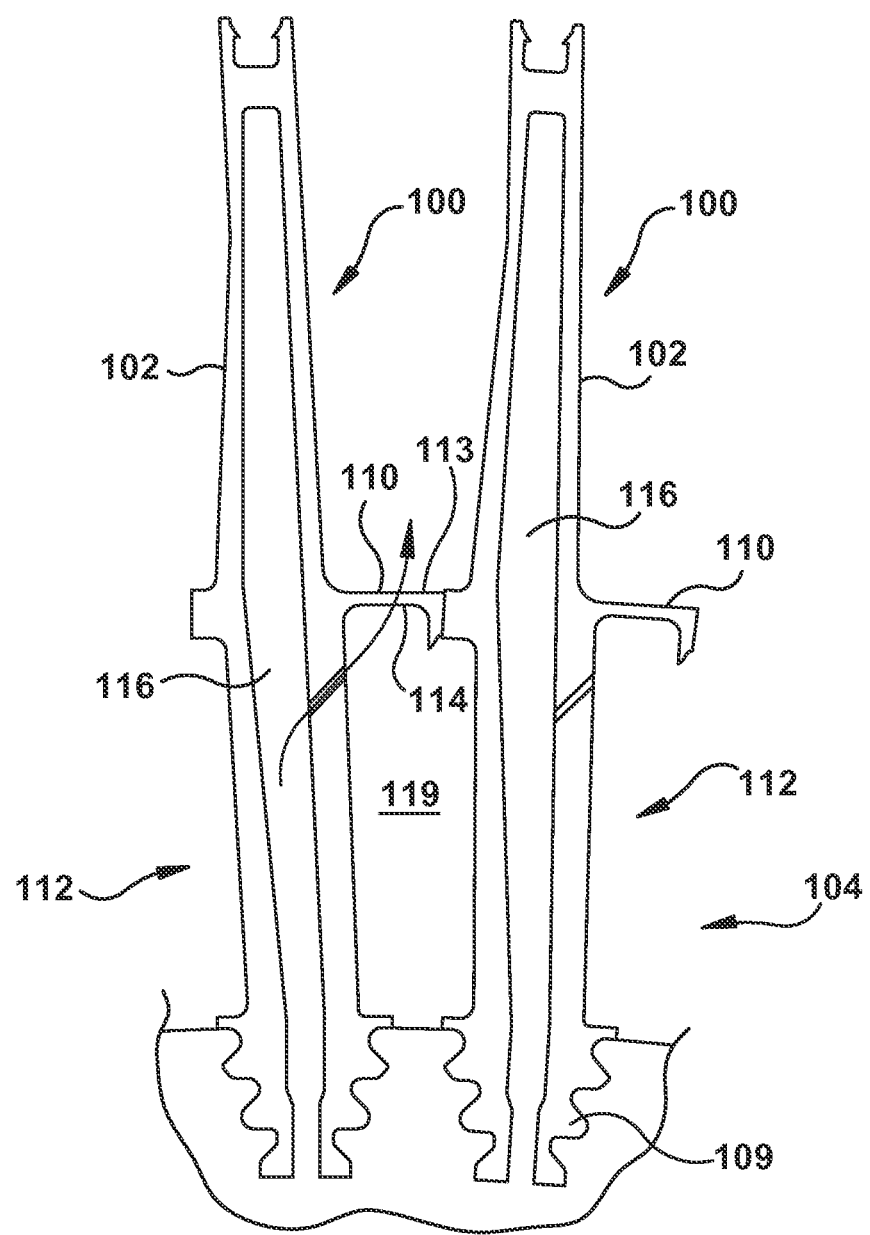
FIG. 3 illustrates a sectional view of neighboring turbine rotor blades in which one or more embodiments of the present disclosure may be used.
Figure 4:
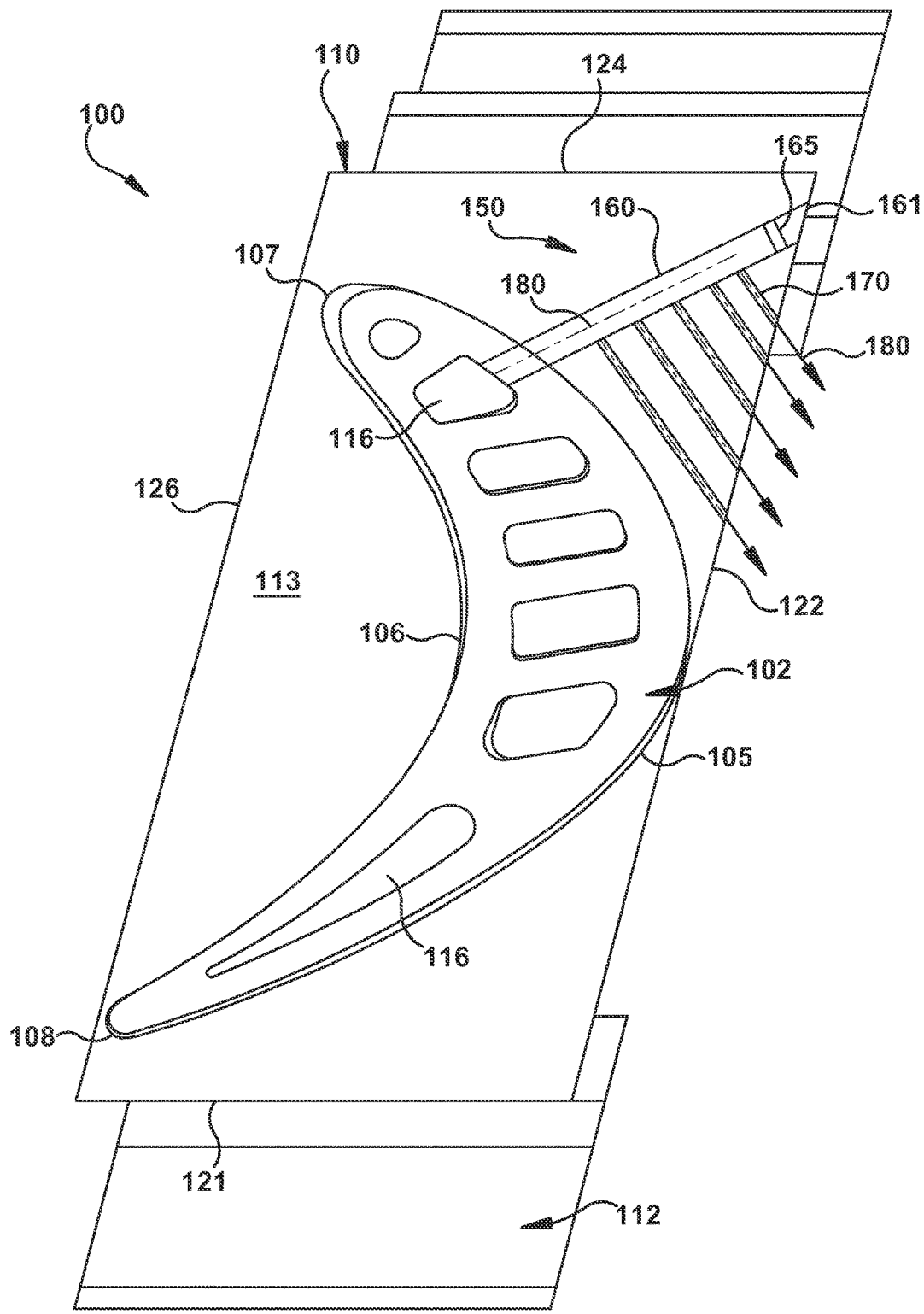
FIG. 4 illustrates a top view of a turbine rotor blade having a platform with a platform cooling arrangement according to one or more embodiments shown or described herein.

Referring now to FIG. 4, a platform cooling arrangement 150 is illustrated disposed in the platform 110 of the turbine rotor blade 100. As discussed above (and with additional reference to FIG. 1), the platform 110 generally comprises the structure from which the airfoil 102 generally extends.

The platform 110 extends from suction side slash face 122 to a pressure side slash face 126 and from an aft edge 121 to a forward edge 124. As should be appreciated by those skilled in the art, the platform 110 will experience a range of elevated temperatures during operation. Specifically, the relative "hot" portion of the platform 110 on the pressure side of the airfoil 102 may experience higher elevated temperatures than the relative "cool" portion of the platform 110 on the suction side of the airfoil 102. Platform cooling arrangements 150 as disclosed and described herein may be utilized to help control the temperature of one or more of these areas of the platform 110, particularly through a platform cooling arrangement 150 disposed in the relative "cool" portion of the platform 110.

As illustrated in FIGS. 4-8, the platform cooling arrangements 150 generally comprise an arrangement of cooling channels that distribute coolant 180 from one or more interior cooling passages 116 of the turbine rotor blade 100 about the convex suction face 105 side of the airfoil 102. Specifically, the platform cooling arrangement 150 generally comprises a feedhole 160 and one or more branch holes 170 to distribute coolant 180 from one or more interior cooling passages 116 throughout at least a portion of the platform 110 and at least partially exiting the suction side slash face 122.

The feedhole 160 generally comprises a cooling channel that extends from the suction side slash face 122 to the interior cooling passage 116 of the turbine rotor blade 100. The feedhole 160 is positioned such that it captures coolant 180 from one or more of the interior cooling passages 116 such that it can be distributed through the platform cooling arrangement 150 via the one or more branch holes 170 as should be appreciated herein.

The feedhole 160 can be formed through a variety of methods such that it can be created after the turbine rotor blade 100 is already cast or otherwise manufactured. For example, the feedhole 160 may be linear such that it can be machined (e.g., drilled) into a preexisting platform 110. Specifically, a drill or other material excavating device may be inserted along the suction side slash face 122 and advanced towards the interior cooling passages 116. By avoiding curved, serpentine or other complex designs, the feedhole 160 may be more readily added to a preexisting turbine rotor blade 100 without having to alter the original manufacturing (e.g., casting) process. Such embodiments may thereby allow for the incorporation of platform cooling arrangements 150 into both new make and used turbine rotor blades 100.

In some embodiments, an exterior end 161 (i.e., the end distal the interior cooling passage 116) of the feedhole 160 may be capped using a plug 165. The plug 165 may be inserted into the feedhole 160 after it is machined into the platform 110 to force coolant 180 from the interior cooling passages 116 to exit via the one or more branch holes 180 as opposed to escaping out the exterior end 161 of the feedhole 160. The plug may comprise any structure that can withstand the relevant ambient operating temperature and the pressure of the coolant 180 flowing through the feedhole 160. In even some embodiments, the plug 161 may comprise a metering hole (not illustrated) to allow for the passage of at least a portion of the coolant 180 out the exterior end 161 of the feedhole 160. In such embodiments, the metering hole cross-sectional area (i.e., the size of the hole) may be smaller than the feedhole cross-sectional area to limit or control the amount of coolant 180 passing there through. Such embodiments may allow for the adjustment or throttling of the amount of coolant 180 passing through the one or more branch holes 170 such as when the pressure of coolant 180 from the interior cooling passage is higher than required, or when it is otherwise sought to have coolant 180 exit out the feedhole 160.

The feedhole 160 may comprise any dimensions (e.g., length and cross-sectional area) to adequately facilitate the flow of coolant 180 from the interior cooling passage 116 to the one or more branch holes 170. In some embodiments, the size and the position of the feedhole 160 may be adjusted such that its depth from the topside 113 of the platform 110 is controlled to better allow for convection cooling there between. In some embodiments, the size and position of the feedhole 160 may be selected based on the initial flow rate of the coolant 180 through the interior cooling passage 116 and a targeted flow rate of coolant 180 through the one or more branch holes 170.

In some embodiments, such as those illustrated in FIGS. 4-8, the platform cooling arrangement 150 may comprise a single feedhole 160. However, in some embodiments, the platform cooling arrangement may comprise a plurality of feedholes, each of which that extend from the suction side slash face 122 to the interior cooling passage 116 of the turbine rotor blade 100. In such embodiments, one or more of the plurality of feedholes 160 may comprise branch holes 170 extending therefrom as should be appreciated herein.

In even some embodiments, the platform cooling arrangement 150 may comprise a feedhole 160 that extends from the interior cooling passages 116 to the forward edge 124 of the platform 110. Such embodiments may provide for alternative configurations of the feedhole(s) 160 and/or the branch hole(s) 170 extending therefrom.

With continued reference to FIG. 4, the platform cooling arrangement 150 further comprises one or more branch holes 170 that each extend from the feedhole 160 to the suction side slash face 122 so that, in operation, coolant 180 may flow from the coolant source from the interior cooling passage 116, through the feedhole 160 and through the one or more branch holes 170 thereby exiting the platform 110 along the suction side slash face 116.

Similar to the feedhole 160, the one or more branch holes 170 can be formed through a variety of methods such that it can be created after the turbine rotor blade 100 is already cast or otherwise manufactured. For example, the one or more branch holes 170 may be linear such that they can be machined (e.g., drilled) into a preexisting platform 110. Specifically, a drill or other material excavating device may be inserted along the suction side slash face 122 and advanced towards the feedhole 160. By avoiding curved, serpentine or other complex designs, the one or more branch holes 170 may be more readily added to a preexisting turbine rotor blade 100 without having to alter the original manufacturing (e.g., casting) process. Such embodiments may thereby allow for the incorporation of platform cooling arrangements 150 into both new make and used turbine rotor blades 100.

The one or more branch holes 170 may comprise any numbers and dimensions (e.g., length and cross-sectional area) to adequately facilitate the flow of coolant 180 from the interior cooling passage 116, through the feedhole 160 and to the one or more branch holes 170. In some embodiments, the platform cooling arrangement 150 may comprise a single branch hole 170 branched off from the feedhole 160.

Figure 5:
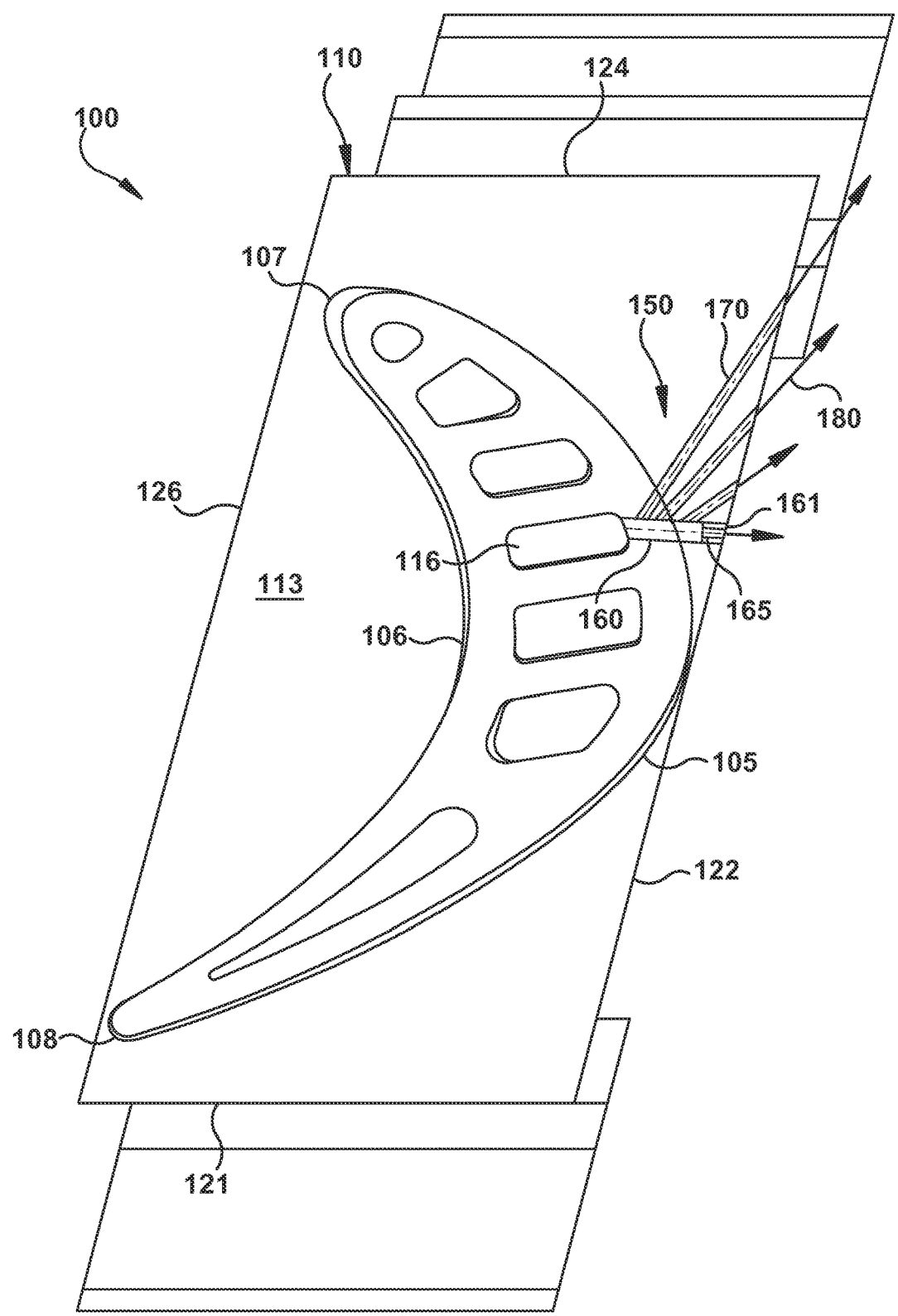
FIG. 5 illustrates a top view of a turbine rotor blade having a platform with another platform cooling arrangement according to one or more embodiments shown or described herein.

In other embodiments, such as those shown in FIGS. 4-8, the platform cooling arrangement 150 may comprise a plurality of branch holes 170 extending from the feedhole 160. In such embodiments, each of the branch holes 170 may extend from the feedhole 160 at substantially the same angle and run in substantially parallel directions (such as illustrated in FIG. 4), each of the branch holes 170 may extend from the feedhole 160 at different angles and run in substantially non-parallel directions (such as illustrated in FIG. 5), or combinations thereof.

In some embodiments, the size and the position of the one or more branch holes 170 may be adjusted such that their depth from the topside 113 of the platform 110 is controlled to better allow for convection cooling there between. In some embodiments, the size and position of the one or more branch holes 170 may be selected based on the initial flow rate of the coolant 180 through the interior cooling passage 116 (and the feedhole 160) and a targeted flow rate of coolant 180 through the one or more branch holes 170.

In some embodiments, the branch hole cross-sectional area for each of the one or more branch holes 170 may be smaller than the feedhole cross-sectional area for the feedhole 160. Such embodiments may help facilitate a more uniform distribution of coolant 180 through the entire platform cooling arrangement. In some embodiments, each of the branch holes 170 may comprise the same or substantially similar cross-sectional area. In other embodiments, the branch holes 170 may comprise a variety of different cross-sectional areas such as to help facilitate the distribution of coolant 180. It should be appreciated that while specific embodiments have been presented herein relating to the amount, sizes and locations of the one or more branch holes 170, these arrangements are used for exemplary purposes and alternative or additional embodiments may further be realized.

Referring now to FIGS. 4-7, the platform cooling arrangement 150 may comprise a variety of configurations comprising the feedhole 160 and one or more branch holes 170. For example, in some embodiments, such as that illustrated in FIG. 4, the platform cooling arrangement 150 may comprise the feedhole 160 extending from the suction side slash face 122 to the interior cooling passage 116 as discussed herein. The platform cooling arrangement 150 may further comprise a plurality of branch holes 170 each extending from the feedhole 160 to suction side slash face 122, wherein each of the branch holes 170 are branched off from the feedhole 160 on the aft edge 121 side of the feedhole 160 (as opposed to the forward edge 124 side of the feedhole 160).

Conversely, in some embodiments, such as that illustrated in FIG. 5, the platform cooling arrangement 150 may comprise the feedhole 160 extending from the suction side slash face 122 to the interior cooling passage 116 as discussed herein. However, the platform cooling arrangement 150 may further comprise a plurality of branch holes 170 each extending from the feedhole 160 to suction side slash face 122, wherein each of the branch holes 170 are branched off from the feedhole 160 on the forward edge 124 side of the feedhole 160 (as opposed to the aft edge 121 side of the feedhole 160).

Figure 6:
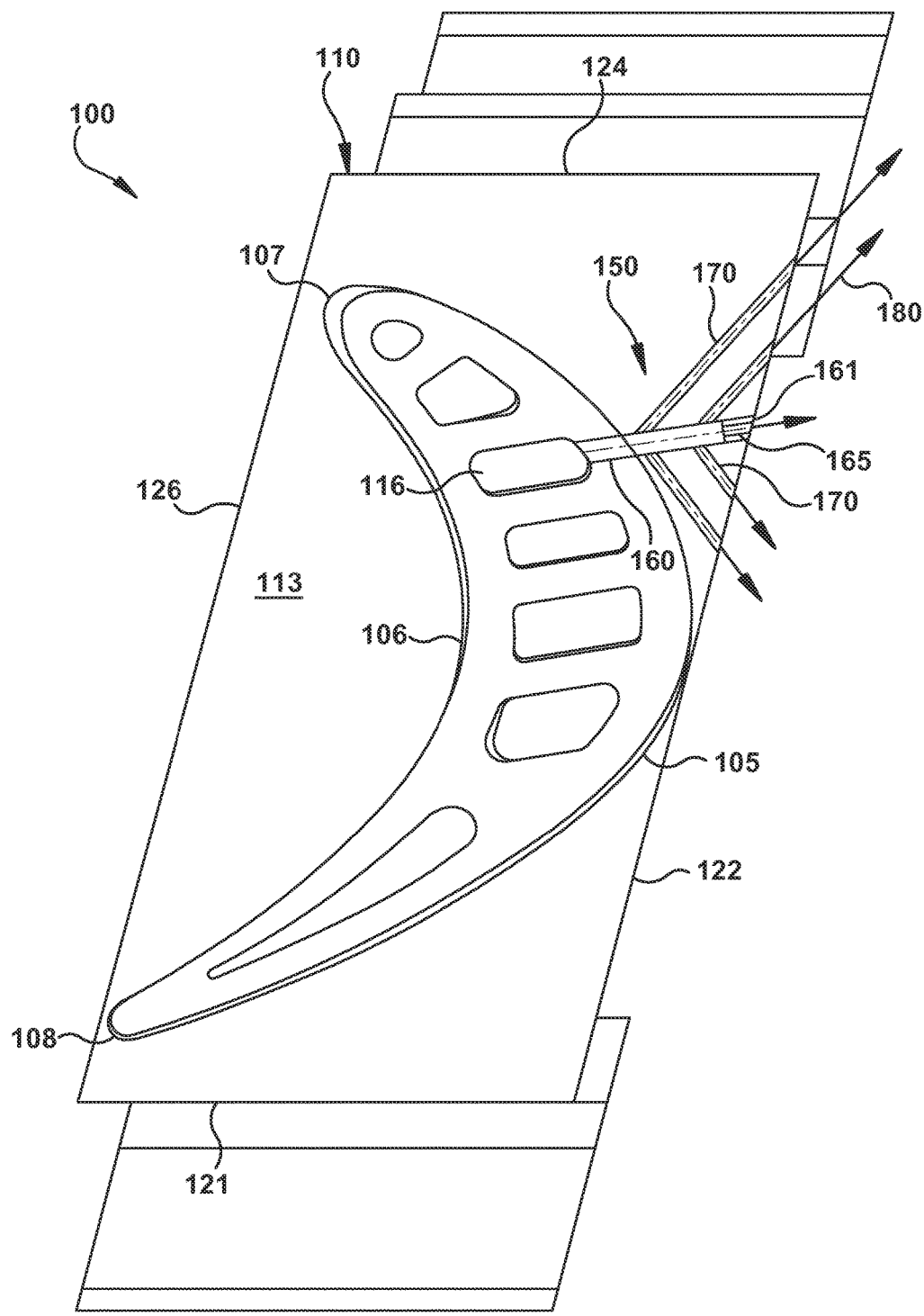
FIG. 6 illustrates a top view of a turbine rotor blade having a platform with another platform cooling arrangement according to one or more embodiments shown or described herein.

In some embodiments, such as that illustrated in FIG. 6, the platform cooling arrangement 150 may comprise branch holes 170 on both sides of the feedhole 160. For example, the platform cooling arrangement 150 may comprise the feedhole 160 extending from the suction side slash face 122 to the interior cooling passage 116 as discussed herein. The platform cooling arrangement 150 may then further comprise a plurality of branch holes 170 each extending from the feedhole 160 to suction side slash face 122, wherein some of the branch holes 170 are branched off from the feedhole 160 on the forward edge 124 side of the feedhole 160 while the rest of the branch holes 170 are branched off from the feedhole 160 on the aft edge 121 side of the feedhole 160.

Figure 7:
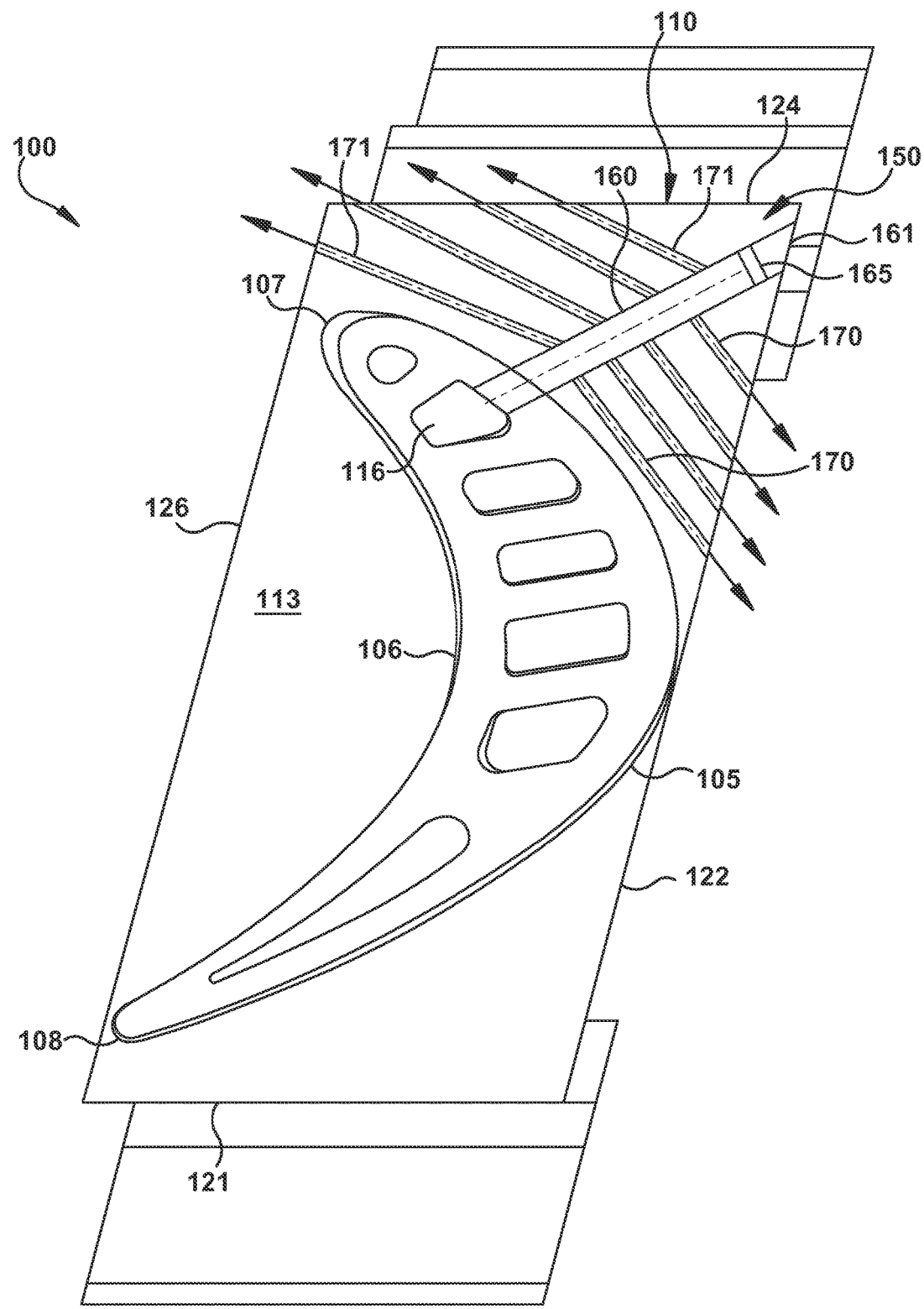
FIG. 7 illustrates a top view of a turbine rotor blade having a platform with another platform cooling arrangement according to one or more embodiments shown or described herein.

In some embodiments, such as that illustrated in FIG. 7, one or more additional branch holes 171 may extend from the feedhole 160 to the forward edge 124 or the pressure side slash face 126 of the platform 110. Specifically, the platform cooling arrangement 150 may comprise the feedhole 160 extending from the suction side slash face 122 to the interior cooling passage 116 as discussed herein. The platform cooling arrangement 150 may then further comprise a plurality of branch holes 170 each extending from the feedhole 160 to suction side slash face 122. Furthermore, the platform cooling arrangement 150 may then further comprise a plurality of additional branch holes 171 extending from the feedhole 160 to either the forward edge 124 of the pressure side slash face 126 as illustrated in FIG. 7. Such embodiments may allow for additional cooling of the platform 110 by broadening the area for which the coolant 180 flows while passing through the platform cooling arrangement 150.

In even some embodiments, the pressure side slash face 126 may comprise one or more surface features (not illustrated) that turbulate (e.g., disrupt or alter) impinging coolant 180 that is exiting a platform cooling arrangement 150 from an adjacent turbine rotor blade 100. The one or more surface features can comprise any change in flat surface geometry such as bumps, turbulators, surface roughness enhancements or any other feature that changes the original flow of the coolant 180 over the surface, or combinations thereof. Such embodiments may help facilitate the cooling of one or more parts of the platform 110 via the coolant 180.

It should be appreciated that while specific platform cooling arrangements 150 are described and illustrated herein, these arrangements are used for exemplary purposes and alternative or additional embodiments may further be realized.

Figure 8:
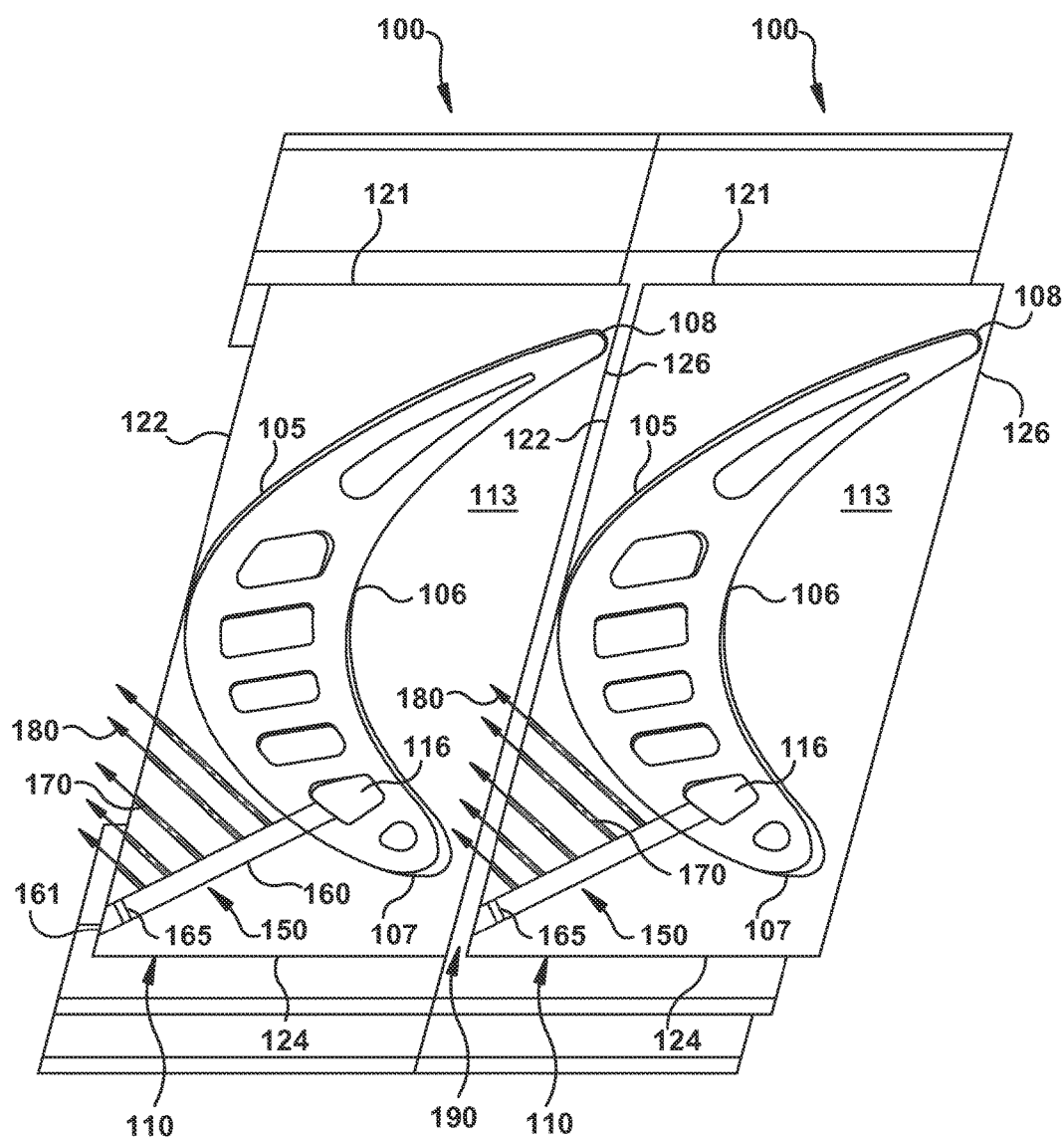
FIG. 8 illustrates a top view of neighboring turbine rotor blades having a platforms with platform cooling arrangements according to one or more embodiments shown or described herein.

Referring now to FIG. 8, neighboring turbine rotor blades 100 are illustrated each having platforms 110 with platform cooling arrangements 150. In operation, coolant 180 will flow from a coolant source through an interior cooling passage 116 in the turbine rotor blade 100. A portion of the coolant 180 will then flow through the feedhole 160 and then through one or more branch holes 170, at least some of which exits along the suction side slash face 122. The coolant 180 exiting the branch holes 170 that extend between the feedhole 160 and the suction side slash face 122 will thereby impinge the pressure side slash face 126 of the platform 110 of the neighboring turbine rotor blade 100.

The platform cooling arrangements 150 can thereby facilitate the cooling of the turbine rotor blades 100 using the flow of coolant 180 in a variety of mechanisms. First, the coolant 180 flowing through the platform cooling arrangement 150 can cool at least a portion of the platform (such as the relative "cool" portion of the platform 110 on the suction side of the airfoil 102) through convection. Second, the coolant 180 that exits the one or more branch holes 170 along the suction side slash face 122 can cool the adjacent bucket (e.g., the relative "hot" portion of the platform 110 on the pressure side of the airfoil 102) through impingement of its surface. Third, the coolant 180 that exits the one or more branch holes 170 along the suction side slash face 122 can also purge hot gas from the trench 190 between turbine rotor blades 100 further helping cool the platforms 110.

Figure 9:
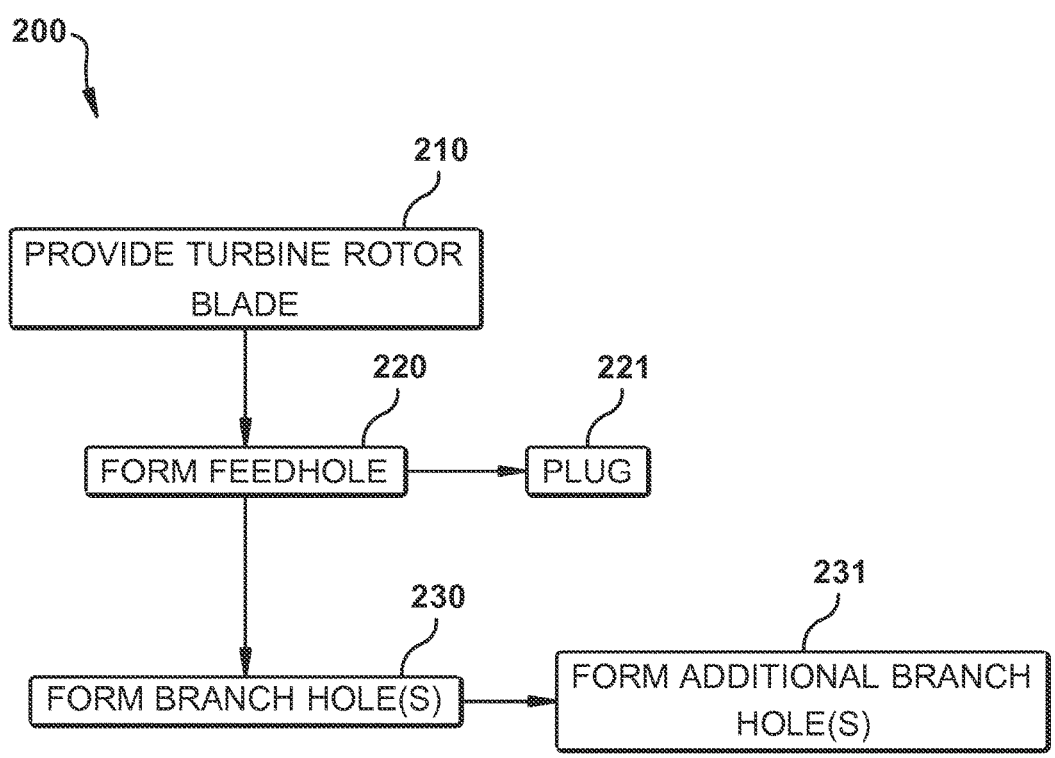
FIG. 9 illustrates a method for forming a platform cooling arrangement in a turbine rotor blade according to one or more embodiments shown or described herein.

Referring now primarily to FIG. 9, and with background reference to FIGS. 1-8, a method 200 is illustrated for forming a platform cooling platform 150 as disclosed and described herein.

The method 200 first comprises providing a turbine rotor blade 100 in step 210. As discussed above, the turbine rotor blade 100 can generally comprise a platform 110 at an interface between an airfoil 102 and root 104, wherein the turbine rotor blade 100 includes an interior cooling passage 116 formed therein that extends from a connection with a coolant source (not illustrated) at the root 104 to the approximate radial height of the platform 110, and wherein a suction side of the platform 110 comprises a topside 113 extending circumferentially from the airfoil 102 to a suction side slash face 122. The turbine rotor blade 100 provided in step 210 can comprise a new make part that has been cast but not yet been used in operation, or a used part that has been utilized in a turbine operation and is ready to undergo modification (e.g., maintenance, repair, enhancement or the like).

The method 200 further comprises forming a feedhole 160 in step 220 that extends from the suction side slash face 122 to the interior cooling passage 116 and forming one or more branch holes 170 in step 230 that each extends from the feedhole 160 to the suction side slash face 122. Forming the feedhole 160 in step 220 and forming the one or more branch holes 170 in step 230 may occur in any relative order (or simultaneously) so long as they ultimately connect to provide a fluid path for coolant 180. Moreover, as discussed above, the feedhole 160 and one or more branch holes 170 may be formed in steps 220 and 230 respectively using any suitable device such as a drill or similar machine.

As discussed above with exemplarily reference to FIGS. 4-8 the feedhole 160 and the one or more branch holes 170 to make up the platform cooling arrangement 150 may comprise a variety of sizes, shapes and relative configurations. For example, the feedhole 160 and the one or more branch holes 170 may be linear such that they can be readily machined (e.g., drilled) into the preexisting turbine rotor blade 100. In some embodiments, the method may further comprise plugging an exterior end 161 of the feedhole 160 in step 221. In even some embodiments, the plug 161 may comprise a metering hole to allow for the passage of at least a portion of the coolant 180 out the exterior end 161, wherein the metering hole cross-sectional area is smaller than a feedhole cross-sectional area. Furthermore, the one or more branch holes 170 may extend from the aft end side and/or the forward edge side of the feedhole 160.

In even some embodiments, the method may comprise forming one or more additional branch holes 171 in step 231 that extend from the feedhole 160 to the forward edge 124 and/or the pressure side slash face 126 of the platform 110. In some embodiments, the branch hole cross-sectional area of at least one of the one or more branch holes 170 may be smaller than a feedhole cross-sectional area of the feedhole 160. In some embodiments, the coolant 180 may thereby exit at least one of the branch holes 170 to impinge the pressure side slash face 126 of a neighboring turbine rotor blade 100. In even some embodiments, the turbine rotor blade 100 may further comprise one or more surface features (not illustrated) on the pressure side slash face 126 that can turbulate impinging coolant 180 exiting from a platform cooling arrangement 150 of an adjacent turbine rotor blade 100.

It should now be appreciated that platform cooling arrangements as disclosed and described herein can be readily provided into platforms of preexisting turbine rotor blades for additional cooling mechanisms. The linear structure of the individual components (i.e., the feedhole and the one or more branch holes) of the platform cooling arrangement allow for simple formation through drilling or other similar machining operations without disrupting the original casting or other manufacturing of the turbine rotor blade itself. Moreover, the location and configuration of the platform cooling arrangement can provide cooling of the platform itself through convection, cooling of the neighboring turbine rotor blade through impingement, and the purging of hot gas from the trench between two turbine rotor blades.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A platform cooling arrangement in a turbine rotor blade, the turbine rotor blade comprising:
   an airfoil;
   a root; a platform at an interface between the airfoil and the root;
   an interior cooling passage formed within the turbine rotor blade extending from a connection with a coolant source at the root through the platform to an approximate radial height of the airfoil;
   a platform suction side with a topside extending circumferentially from the airfoil to a suction side slash face;
   a platform feedhole extending through the platform as a single linear passage between the suction side slash face and the interior cooling passage within the turbine rotor blade, with the interior cooling passage extending from the connection with the coolant source at the root through the platform to the approximate radial height of the airfoil; and
   a plurality of branch holes each extending as a single linear passage through the platform between the feedhole and the suction side slash face;
   wherein coolant flows from the interior cooling passage, through the feedhole to the plurality of branch holes to exit the platform along the suction side slash face impinging on a pressure side slash face of an adjacent turbine rotor blade thereby cooling the adjacent turbine rotor blade.

2. The platform cooling arrangement of claim 1, wherein each of the branch holes extends from the feedhole at substantially the same angle.

3. The platform cooling arrangement of claim 2, wherein each of the branch holes extends perpendicularly from the feedhole.

4. The platform cooling arrangement of claim 1, wherein the feedhole comprises a plug disposed approximate an exterior end of the feedhole distal the interior cooling passage.

5. The platform cooling arrangement of claim 4, wherein the plug comprises a metering hole to allow for passage of at least a portion of the coolant out the exterior end of the feedhole, wherein a metering hole cross-sectional area is smaller than a feedhole cross-sectional area.

6. The platform cooling arrangement of claim 1, wherein at least one branch hole extends from an aft edge side of the feedhole and at least one branch hole extends from a forward edge side of the feedhole.

7. The platform cooling arrangement of claim 1, further comprising an additional branch hole that extends from the feedhole to a forward edge of the platform.

8. The platform cooling arrangement of claim 1, further comprising an additional branch hole that extends from the feedhole to a pressure side slash face of the platform.

9. The platform cooling arrangement of claim 1, wherein coolant exiting the plurality of branch holes impinges the pressure side slash face of the adjacent turbine rotor blade thereby cooling the pressure side slash face.

10. A platform cooling arrangement in a turbine rotor blade, the turbine rotor blade comprising:
an airfoil;
a root;
a platform at an interface between the airfoil and the root;
an interior cooling passage formed within the turbine rotor blade extending from a connection with a coolant source at the root through the platform to an approximate radial height of the airfoil;
a platform suction side with a topside extending circumferentially from the airfoil to a suction side slash face;
a platform feedhole extending through the platform as a single linear passage between a forward edge of the platform and the interior cooling passage, with the interior cooling passage extending from the connection with the coolant source at the root through the platform to the approximate radial height of the airfoil; and
a plurality of branch holes each extending through the platform as a single linear passage between the feedhole and the suction side slash face operative for coolant flow from the interior cooling passage, through the feedhole to the plurality of branch holes to exit the platform along the suction side slash face to impinge a pressure side slash face of an adjacent turbine rotor blade thereby cooling the adjacent turbine rotor blade.

11. The platform cooling arrangement of claim 10, further comprising one or more surface features on the pressure side slash face that turbulate the impinging coolant flow exiting from the plurality of branch holes.

12. A method for forming a platform cooling arrangement in a turbine rotor blade, the method comprising:
providing a turbine rotor blade comprising an airfoil, a root, a platform at an interface between the airfoil and the root, an interior cooling passage formed within the turbine rotor blade extending from a connection with a coolant source at the root through the platform to an approximate radial height of the airfoil, and a platform suction side with a topside extending circumferentially from the airfoil to a suction side slash face;
forming a feedhole extending through the platform as a single linear passage between the suction side slash face and the interior cooling passage, with the interior cooling passage extending from the connection with the coolant source at the root through the platform to the approximate radial height of the airfoil;
forming a plurality of branch holes each extending through the platform as a single linear passage between the feedhole to the suction side slash face; and
flowing coolant from the interior cooling passage, through the feedhole to the plurality of branch holes to exit the platform along the suction side slash face to impinge a pressure side slash face of an adjacent turbine rotor blade to cool the adjacent turbine rotor blade.

13. The method of claim 12, wherein each of the branch holes extends from the feedhole at substantially the same angle.

14. The method of claim 13, wherein each of the branch holes extends perpendicularly from the feedhole.

15. The method of claim 12, further comprising inserting a plug in an exterior end of the feedhole distal the interior cooling passage.

16. The method of claim 15, wherein the plug comprises a metering hole to allow for passage of at least a portion of the coolant out the exterior end of the feedhole, wherein a metering hole cross-sectional area is smaller than a feedhole cross-sectional area.

17. The method of claim 12, further comprising forming an additional branch hole extending from the feedhole to a forward edge of the platform.

18. The method of claim 12, wherein a branch hole cross-sectional area of at least one of the branch holes is smaller than a feedhole cross-sectional area of the feedhole.

19. The method of claim 12, wherein coolant exiting the branch holes impinges the pressure side slash face of an adjacent turbine rotor blade thereby cooling the pressure side slash face.

20. The method of claim 19, wherein the pressure side slash face of the turbine rotor blade comprises one or more surface features that turbulate impinging coolant exiting from the branch holes.

* * * * *